A. H. C. GIBSON.
MOTOR VEHICLE.
APPLICATION FILED DEC. 27, 1916.
1,297,676.
Patented Mar. 18, 1919.
4 SHEETS—SHEET 2.
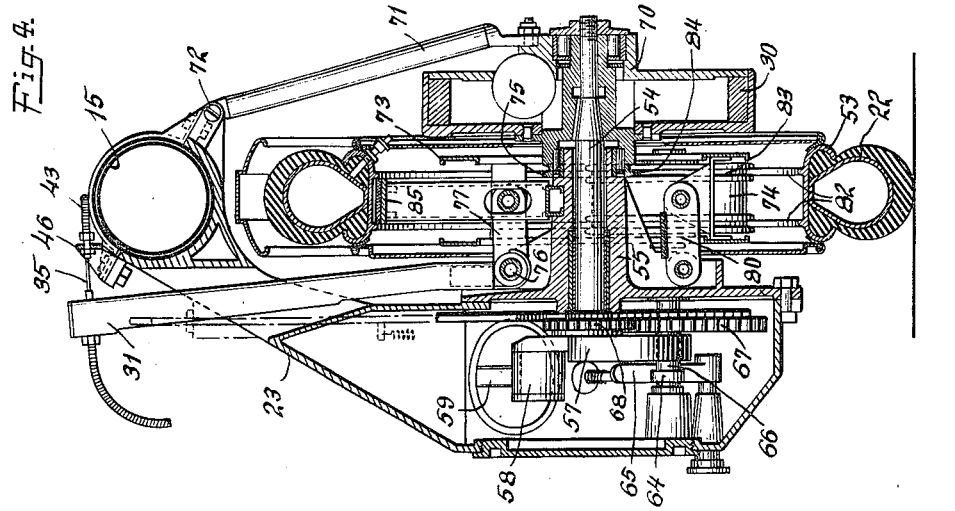
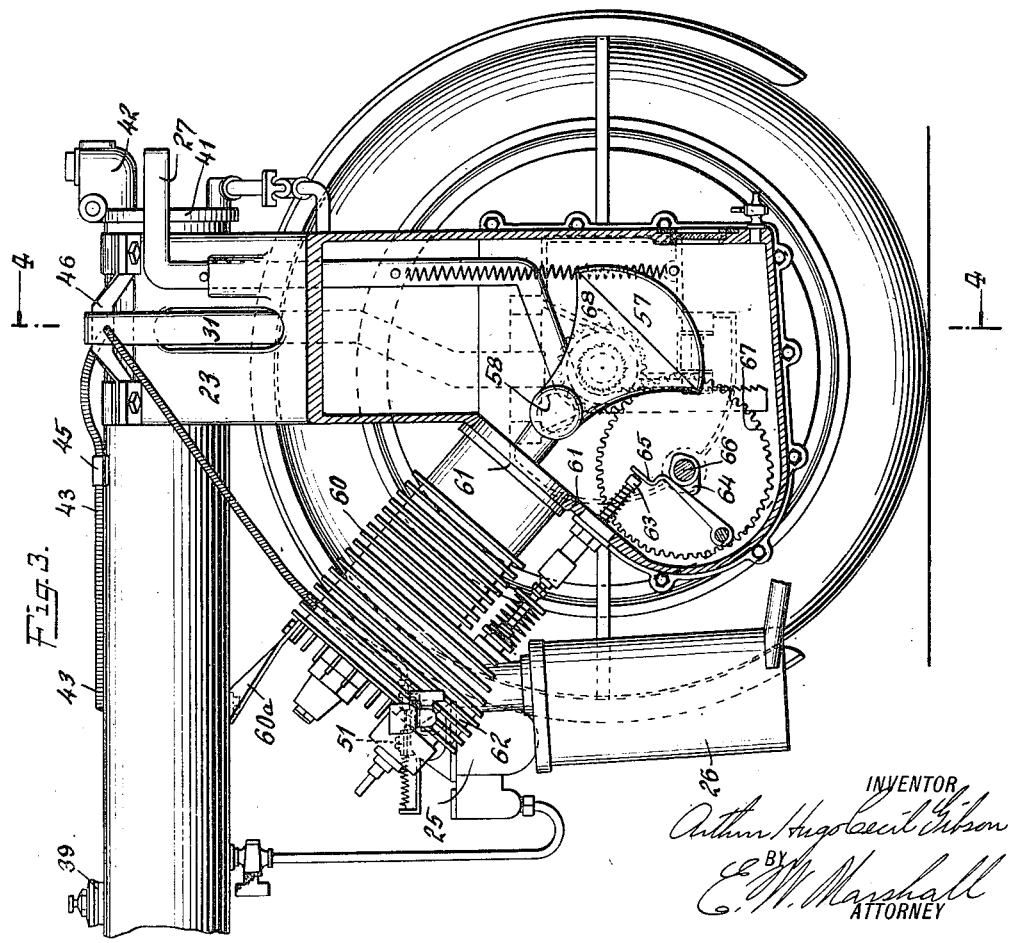

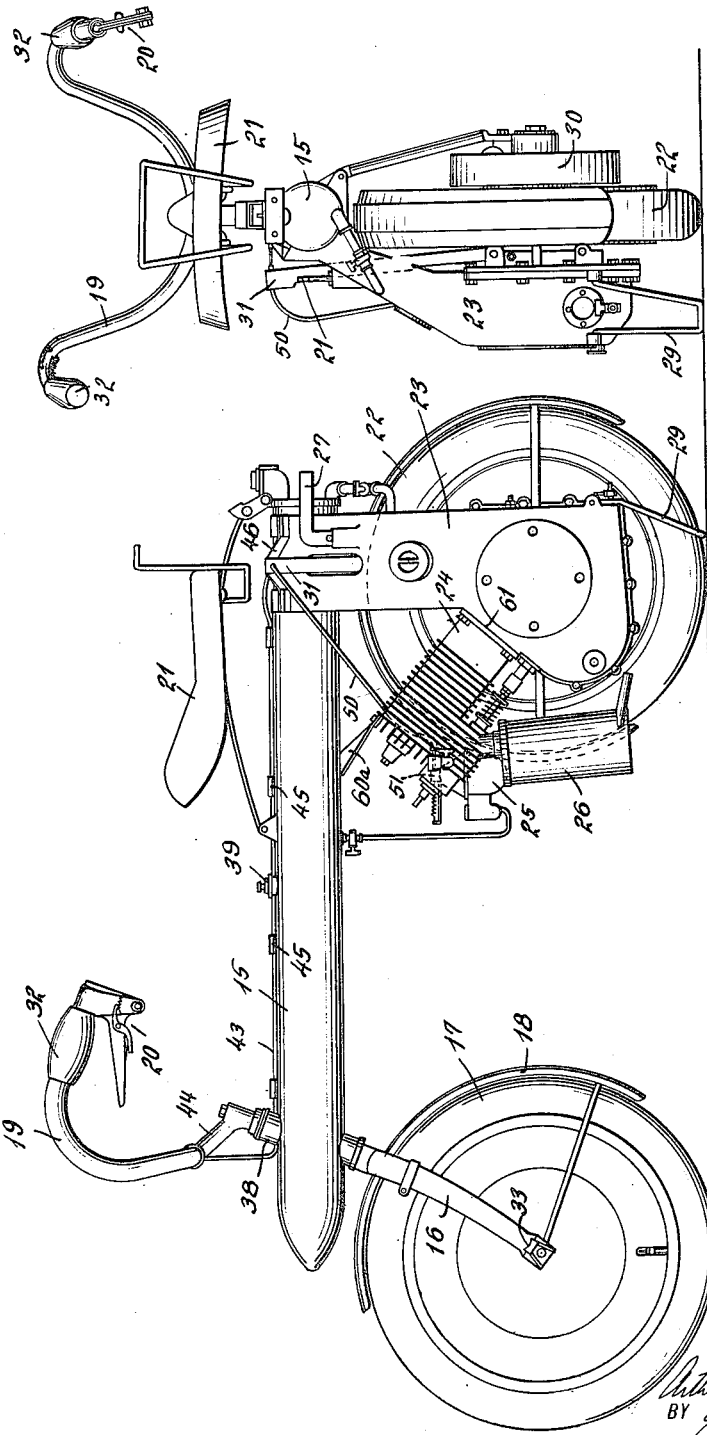

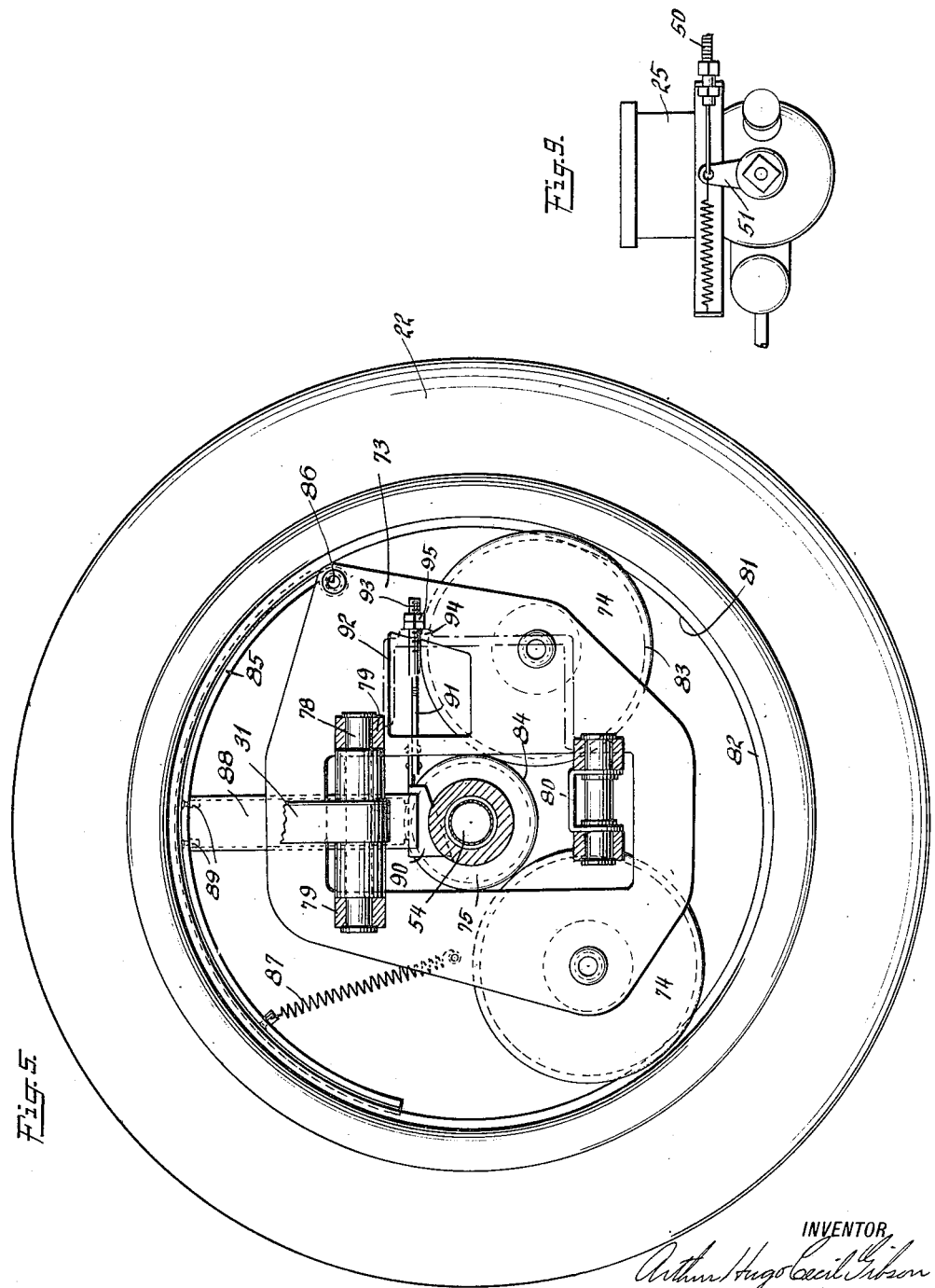

A. H. C. GIBSON.
MOTOR VEHICLE.
APPLICATION FILED DEC. 27, 1916.
1,297,676.
Patented Mar. 18, 1919.
4 SHEETS—SHEET 4.
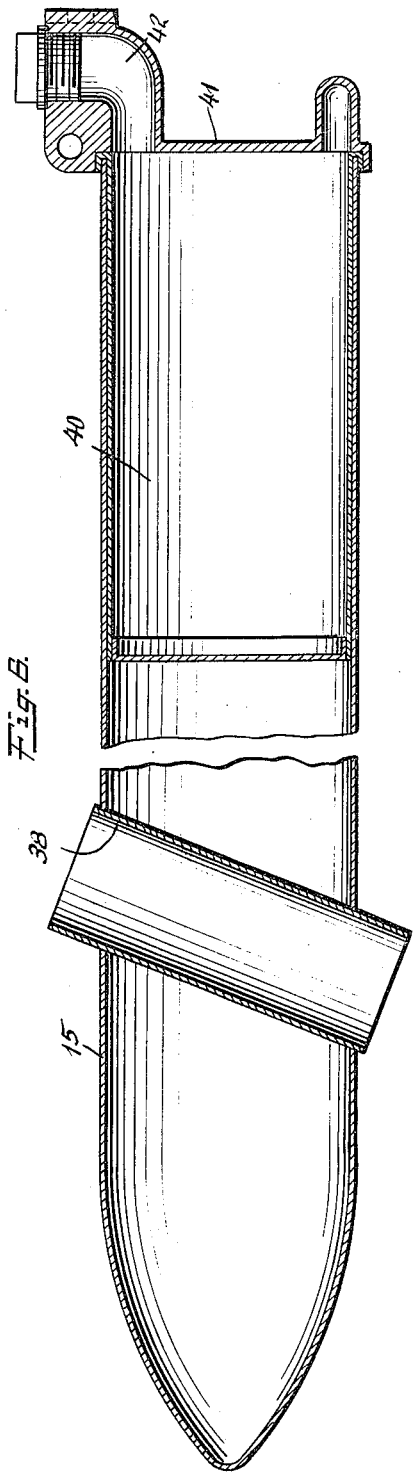
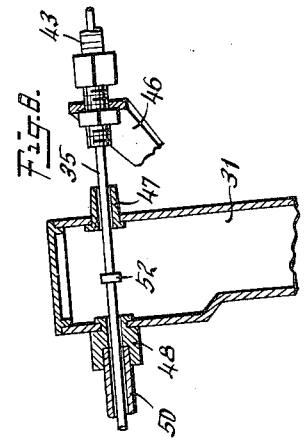
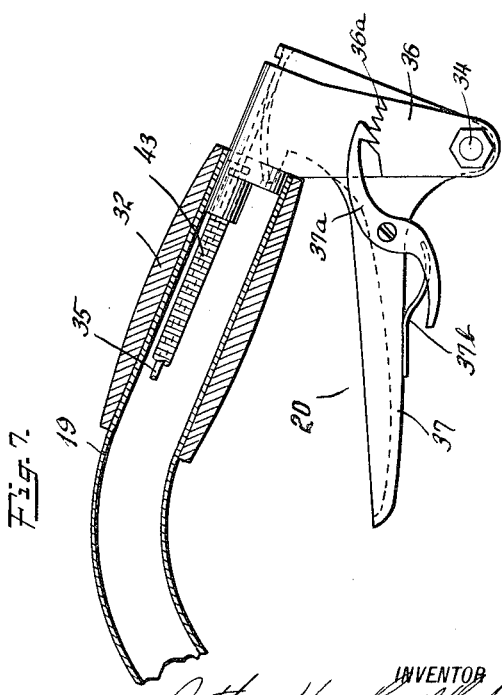
INVENTOR
Arthur Hugo Cecil Gibson
BY E. W. Marshall
ATTORNEY

UNITED STATES PATENT OFFICE.

ARTHUR HUGO CECIL GIBSON, OF NEW YORK, N. Y., ASSIGNOR, BY MESNE ASSIGNMENTS, TO GIBSON MON-AUTO COMPANY, OF NEW YORK, N. Y., A CORPORATION OF NEW JERSEY.

MOTOR-VEHICLE.

1,297,676.      Specification of Letters Patent.      Patented Mar. 18, 1919.

Application filed December 27, 1916. Serial No. 139,162.

*To all whom it may concern:*

Be it known that I, ARTHUR HUGO CECIL GIBSON, a subject of the King of England, and a resident of New York, county and State of New York, United States of America, have invented certain new and useful Improvements in Motor-Vehicles, of which the following is a specification, reference being had to the accompanying drawings, forming a part thereof.

My invention relates to motor vehicles or automobiles and has special reference to small, light road vehicles which may be easily carried by the rider and stored in a small space when not in use. In my copending application Serial No. 13,792, filed March 11, 1915, I have shown and described a motor vehicle of the same class as that to which my present invention pertains.

One object of my present invention is to provide a vehicle of the character above indicated that shall be controlled and balanced by the rider in a particularly simple and easy manner, rendering it safe and suitable for boys and girls as well as men and women to drive.

Another object is to provide a frame structure that shall be attractive in appearance and possess advantages not hitherto combined in any unitary structure.

Another object is to provide a unitary control transmission member by means of which it is not only possible to effect the desired control of the throttle and of the driving connections between the motor and the vehicle, but also a controller that is so arranged as to make it both natural and easy to govern the vehicle and practically impossible to make a false move. At the same time the single control means of my present invention governs the application of the brake.

It is of course well known that in order to avoid accident and in order to properly govern motor vehicles as hitherto arranged, a very definite relation must be maintained between the action of the throttle, the control of the clutch and the control of the brakes; for example, the throttle should be closed and the clutch released in starting the engine, the brake must be released before the clutch is engaged, etc.

I am aware that in some cases elaborate systems of interlocking have been provided. However, nothing of this character is necessary with my invention because my arrangement is such that a very simple lever, by a simple swinging movement on its pivot, governs the entire power plant of the vehicle with the single exception of turning over the motor in starting. This is accomplished by a starting mechanism which *per se* does not form a part of this invention but is shown and described in my copending application Serial No. 139,161, filed on even date herewith.

Another object of my invention is to avoid the necessity for a clutch, by providing a direct driving means which forms part of the reducing gearing and which may be readily and quickly moved into and out of driving contact so as to permit the motor to drive the vehicle, or run free as desired. Furthermore, the driving connection is so arranged that the weight of the vehicle and the load are both active to reduce the slip and increase the driving effort between the power transmission members as well as to increase the traction between the driving wheel and the road bed.

The power transmission or driving and brake actuating mechanisms *per se* are covered in my copending application Serial No. 139,161, filed on even date herewith.

In order that my invention may be thoroughly understood, I will now proceed to describe the same in the following specification and then point out the novel features thereof in appended claims.

Referring to the drawings:

Figure 1 is a side elevation and

Fig. 2 a rear view of a motor vehicle which embodies my invention and is arranged and constructed in accordance therewith.

Fig. 3 is a partially sectional elevation of the driving wheel and the vehicle frame, looking from one side.

Fig. 4 is a transverse sectional elevation, taken on the line 4—4 of Fig. 3.

Fig. 5 is a view of the driving wheel and power transmission mechanism on a larger scale.

Fig. 6 is a sectional view showing the frame in detail.

Fig. 7 is a view of the hand control lever and its connections.

Fig. 8 is a view of the power transmission control lever and its connections.

Fig. 9 is a detail view of the throttle or carbureter connections.

The vehicle comprises in general, a frame having a tubular body designated 15, a front fork 16, a front wheel 17 supported in the fork, protected by a mud guard 18, handle bars 19, a control lever 20 supported thereon, a saddle 21, a driving wheel 22, a combined crank casing and frame section 23 secured to the tubular body 15, an engine 24, a carbureter 25, a muffler 26, a starting lever 27, a rest 29, a fly wheel 30, suitable driving mechanism and a control lever 31 therefor.

The handle bars have grips 32 and the vehicle is steered in the usual way by turning the handle bars. The forks 16 are provided with foot rests 33.

The control lever 20 is shown in detail in Fig. 7 and has a bell crank formation, being pivoted at 34 on a bracket 36 which is affixed to one of the handle bars 19 and connected to a Bowden wire 35, as clearly shown in Fig. 7. The handle lever has one arm 37 which extends adjacent to the handle grip 32 and may readily be grasped by the hand of the rider. Mounted on the lever arm 37 is a pawl 37ª which is adapted to coöperate with a ratchet segment 36ª on the bracket 36. The pawl is pressed by a spring 37ᵇ and is in position to be readily released by the rider's fingers. The notches of the ratchet segment determines the positions of the lever and enable the latter to be set in a desired position without danger of accidental displacement.

The body 15, as clearly shown in the sectional view of Fig. 6, has the general form of a cartridge and extends materially ahead of the inclined tubular bearing 38 in which the front fork 16 is rotatably mounted. The bearing tube extends through the tubular body 15 and is welded or otherwise sealed into place so that the tubular body serves as a tank and is provided with a capped inlet 39 through which it may be filled with gasolene or the like. Into the rear end of the body 15 a tank 40 is sealed and is itself covered by an end cap 41 having an inlet 42 through which the smaller tank 40 may be filled with cylinder oil for example. Thus the body of the frame serves as a carrier for both gasolene and oil.

The Bowden wire 35 is mounted within a relatively stiff flexible conduit 43 which is secured at one end to the bracket 36 at the handle bars, and extends through the handle bar, thence through the central bracket 44 from which point it extends backwardly on top of the body 15 to which it is secured at intervals as indicated at 45.

At the rear it is secured to the bracket 46 which is attached to the frame section 23. The Bowden wire 35 extends through suitable bushings 47—48 in the upper end of the transmission control lever 31 and continues through another section of flexible conduit 50 to the carbureter 25, where it is attached to the throttle lever 51. The lever 31 is hollow and the wire 35 is provided with an enlargement 52 between the bushings 47 and 48 within the hollow lever. The arrangement of parts is such that a limited movement of the wire 35 is permitted, sufficient to govern the throttle without moving the lever 31. After this lost motion is taken up however, by the enlargement 52 coming into engagement with either of the bushings 47 or 48, a further pull on the wire 35 will produce a movement of the lever 31. The lever may be moved to a certain extent for the purpose of disconnecting the engine from the wheel, permitting it to be started and run free and may be still further adjusted in the same direction, to set the brakes within the wheel as hereinafter explained.

After the lost motion is taken up a further pull on the wire does not produce a further motion of the throttle lever since a motion of the lever 31 produces a corresponding motion of the flexible conduit 50 through which the wire extends. The conduit and wire then move together and the slack in the conduit is taken up to some extent instead of any relative movement of the wire within the conduit being produced.

The wire, as already explained, and consequently both the throttle lever and the control lever are directly responsive to the hand lever on the handle bar.

The frame section 23 also constitutes in the structure illustrated, the crank shaft casing of the engine and is offset relative to the central plane of the vehicle in order to permit the driving wheel 53 to be located directly under the body. The engine crank shaft 54 is supported in a sleeve or bearing 55 which extends inwardly from the crank casing and occupies a substantially central position relative to the wheel. A fly wheel 30 is secured to the crank shaft 54 near its outer end on the opposite side of the driving wheel from the engine. The weight of the fly wheel thus serves to a greater or less degree as a counterbalance to the engine in addition to its usual function. The crank head is designated 57 and has a crank pin 58 to which the engine connecting rod 59 is coupled.

The engine cylinder is designated 60 and is bolted or otherwise secured to an inclined surface 61 of the crank casing. It is also connected to the body 15 directly by a strap 60ª. The valve casing is designated 62 and the valve rod extends into the crank casing as shown at 63 where it is adapted to be actuated by a cam 64 and an actuating arm 65. The cam 64 is affixed to the shaft 66 together with a gear wheel 67 which meshes with the driving gear wheel 68 on the crank shaft. There is an outer bearing block and fly wheel casing 70 which is mounted on the fly wheel hub and is held against turning by a hinged brace 71 which is pivotally connected at 72 with the frame section 23 near the body 15. This brace also constitutes a rear fork in conjunction with the frame section 23, although the latter is relied upon to carry most of the weight.

The weight is carried from the vehicle frame to the wheel through the agency either of a frame 73 and a pair of transmission rollers 74, or through the crank shaft 54, a driving roller 75 thereon, and the transmission rollers 74, depending upon the position of the driving roller relative to the rollers 74.

When the control lever 31 is released the driving roller 75 is forced into driving engagement with the rollers 74 by the entire weight of the vehicle, and its load, except such as is taken by the front wheel.

The control lever 31 is however, pivoted at 76 on a projection of the crank casing as shown in Fig. 4, and has the form of a bell crank with a short lateral arm 77 extending into the frame 73 and connected thereto by a pin 78 which is securely mounted in webs 79 thereof.

The frame 73 is furthermore connected to the crank casing by a link 80 which corresponds in length to the lateral arm 77 of the lever 31, the two parts providing a parallel motion connection between the crank casing and the frame.

The rollers 74 are pivotally mounted in the frame 73 as clearly shown in Fig. 5 and are in engagement with an annular race 81 provided within the rim of the driving wheel 53. The rollers may be of any suitable formation to coöperate with the race, which as shown (see Fig. 4) is provided with tapering ribs 82 which extend into corresponding grooves 83 in the rollers.

The driving roller 75 is shaped to coöperate with the rollers 74 but in the structure shown is made with a single annular rib 84 which coöperates with only one of the grooves 83 in each roller. My invention is by no means limited to this specific arrangement and the driving roller may be constructed and shaped in any suitable manner depending on the speed ratio desired between the wheel and the engine and upon the location of the other parts of the device which must be cleared.

A ring segment or brake shoe 85 is pivotally mounted at 86 on the frame 73 and is adapted to coöperate with the annular surface of the race between the ribs 82 of the driving wheel. It is retracted by a spring 87 except when it is set by an upward movement of the crank casing hub 55.

The brake is adjustable relative to the hub by means of a connecting bar 88 attached to an intermediate point in the brake shoe as indicated at 89 and extending near the center of the frame where it is adapted to be acted upon by an adjusting wedge 90. A rod 91 is attached to the wedge and extends outwardly through a hole 92 in the frame 73, being offset for this purpose and terminating in a screw-threaded section 93. This threaded end projects through a boss 94 of the frame 73, adjusting nuts 95 being mounted thereon in position to draw the wedge and move the shoe closer to the coöperating surface of the wheel.

In order that the operation may be clearly understood, it may be assumed that the vehicle is stationary with the rest 29 in the position shown in Fig. 1 to assist in holding the vehicle in an upright position. Furthermore that the handle lever 20 is released so that the throttle is open and the driving roller 75 is in engagement with the transmission rollers 74. The rider first seats himself on the vehicle with his feet on the ground, the arrangement being such that he can sit in this position with perfect ease. Nevertheless the wheel base of the vehicle is sufficiently long so that a man of more than average size may sit comfortably with his feet on the foot rests when the vehicle is in motion.

To start the vehicle the rider first actuates the control handle by pulling the lever arm 37 toward the handle grip 32. This first closes the throttle to a minimum and then when the lost motion is taken up between the enlargement 52 of the Bowden wire and the lever 31, the latter is actuated in such a way as to lift the vehicle frame and crank casing together with the driving roller 75, relative to the frame 73, transmission rollers 74 and the wheel 22. The result is that the driving roller is moved out of contact with the transmission rollers and the engine may now be turned over by pulling upward on the starting lever 27. As soon as the motor starts and acquires suitable speed the transmission rollers may be thrown into engagement by releasing the pawl 37$^a$ and easing off on the control handle 20. This permits the weight of the frame, engine and rider (except for the portion borne by the front wheel) to force the driving roller 75 into driving engagement with the transmission rollers 74. The driving roller is being rotated at a relatively high speed by the motor and now drives the wheel, the rollers serving as a friction clutch to pick up the load gradually. The driving roller acts with the race through the medium of the transmission rollers as a reducing gearing to drive the wheel at a suitable speed while permitting a high speed engine to be used.

As soon as the lever 31 is released the control lever 20 may be moved independently of the lever to adjust the opening of the throttle and control the speed of the vehicle.

When it is desired to stop the vehicle, the lever is actuated as at first, the arm 37 being drawn toward the handle grip 32. This closes the throttle to a minimum, then lifts the driving roller away from the transmission rollers, and finally as the handle is pulled still farther toward the handle grip, the brake shoe 85 is forced upwardly in opposition to the spring 87 into engagement with the annular surface of the race and brings the vehicle to a stop. The engine may be stopped either while the vehicle is running or after it is at rest by opening the ignition circuit in a well known manner.

It is evident that structural variations may be effected within the spirit and scope of my invention, and I intend only such limitations as are imposed by the appended claims.

What I claim is:

1. A motor vehicle comprising a driven wheel, a driving shaft, an interposed transmission means for connecting the wheel to the shaft, a throttle, and a single control means for the throttle and connected by a lost motion connection to the transmission means.

2. A motor vehicle comprising a driven wheel, a driving shaft, interposed transmission means for connecting the wheel to the shaft, means for interrupting said connection, a throttle, and a control lever connected to the throttle and a lost motion connection between said lever and the transmission means said lever being arranged to selectively control the transmission means and the throttle.

3. A motor vehicle comprising a driven wheel, a driving shaft, an interposed transmission means for connecting the wheel to the shaft, a throttle, a brake, and a single control means connected with the throttle, and a lost motion connection between said control means and the transmission means and brake, whereby said control means is arranged to govern the throttle, the transmission means and the brake, as desired.

4. The combination with a driven wheel, a driving shaft, a controllable connection between the shaft and the wheel, a driving motor, a throttle, and a single control means connected with the throttle, and a lost motion connection between said control means and the transmission means whereby said control means is arranged to govern either or both the transmission connection and the throttle.

5. The combination with a driven wheel, a brake, a driving shaft, a motor, a throttle, and a single means connected directly with the throttle and by a lost motion connection with the brake for controlling the throttle and the brake.

6. The combination with a driven wheel, a brake, a driving shaft, a motor, transmission means for connecting the wheel to the shaft, a throttle, and a single means connected to the throttle and to the brake, and to the transmission means by a lost motion connection.

7. A motor vehicle comprising a driven wheel, a driving shaft, interposed means for connecting the wheel to the shaft, means for interrupting said connection, a steering handle, a control lever, a throttle, connecting means between the control lever and the throttle, and a lost motion connection between the connecting means and said interrupting means.

8. A motor vehicle comprising a driven wheel, a driving shaft, interposed means for connecting the wheel to the shaft, means for interrupting said connection, a brake operatively connected thereto, a throttle, a control lever connecting these between the control lever and the throttle, and a lost motion connection between the connecting means and said interrupting means.

9. In a motor vehicle, the combination with a clutch and a throttle, of a control mechanism comprising a steering handle, a pivoted lever having a grip adjacent to the handle, a Bowden wire following the steering handle and attached to one end at the pivoted lever and at the other end to the throttle, and a lost motion connection between the wire and the clutch.

10. In a motor vehicle, the combination with a clutch and a throttle, of a control mechanism comprising a steering handle, a pivoted lever having a grip adjacent to the handle, a Bowden wire following the steering handle and attached at one end to the pivoted lever and at the other end to the throttle, a lost motion connection between the wire and the clutch, and means arranged to accentuate the positions of the lever whereby the wire may be adjusted as desired.

11. A motor vehicle comprising a steering handle, a throttle and a clutch, a bracket attached to the steering handle, a lever pivoted to the bracket, a conduit extending through the steering handle and affixed to the bracket, a Bowden wire extending through the conduit and attached to the lever at one end and to the throttle at the opposite end, and connected to the clutch by a lost motion connection.

12. A motor vehicle comprising a steering handle, a throttle and a clutch, a bracket attached to the steering handle, a lever pivoted to the bracket, a conduit extending through the steering handle and affixed to the bracket, a Bowden wire extending through the conduit and attached to the lever at one end and to the throttle at the opposite end and connected to the clutch by a lost motion connection, and a ratchet and pawl for holding the lever relative to the bracket in a desired position.

13. A motor vehicle comprising a driven wheel, a driving shaft, interposed means for connecting the wheel to the shaft, means for interrupting said connection, a steering handle, a remote control lever associated therewith, a throttle, connecting means between the control lever and the throttle, and a lost motion connection between the connecting means and said interrupting means.

14. A motor vehicle comprising a driven wheel, a driving shaft, interposed means for connecting the wheel to the shaft, means for interrupting said connection, a steering handle, a remote control lever associated therewith, a throttle, a Bowden wire connecting between the control lever and the throttle, and a lost motion connection between the wire and the interrupting means.

15. A motor vehicle comprising a driven wheel, a driving shaft, interposed means for connecting the wheel to the shaft, means for interrupting said connection, a steering handle, a remote control lever associated therewith, a throttle, a guide tube section affixed at one end to the interrupting means and at the opposite end to the throttle, a Bowden wire connected to the remote control lever at one end and to the throttle at the other end and extending through the guide tube, and a lost motion connection between the wire and the interrupting means, whereby a limited movement of the wire and the throttle independently of the interrupting means is permitted.

16. A motor vehicle comprising a driven wheel, a driving shaft, interposed means for connecting the wheel to the shaft, means for interrupting said connection, a steering handle, a remote control lever associated therewith, a throttle, a guide tube section affixed at one end to the interrupting means and at the opposite end to the throttle, a Bowden wire connected to the remote control lever at one end and to the throttle at the other end and extending through the guide tube, and a lost motion connection between the wire and the interrupting means, whereby a limited movement of the wire and the throttle independently of the interrupting means is permitted, said guide tube being so arranged that a further movement of the lever after the lost motion is taken up produces a movement of the interrupting means without any further movement of the throttle.

17. A motor vehicle comprising a driven wheel, a driving shaft, interposed means for connecting the wheel to the shaft, a transmission lever for controlling the driving connection between the shaft and the wheel, a throttle and a single remote means comprising a lost motion connection arranged to successively actuate the throttle alone and then actuate the transmission lever without producing a further movement of the throttle.

18. A motor vehicle comprising a driven wheel, a driving shaft, interposed means for connecting the wheel to the shaft, a transmission lever for controlling the driving connection between the shaft and the wheel, a throttle, a Bowden wire connected to the throttle and connected by a lost motion connection to the transmission lever, and a single remote means for producing a pull on the wire to govern both the throttle and the transmission lever.

19. A vehicle frame comprising a longitudinal tubular beam of relatively large diameter closed at the forward end, a bearing post extending through the beam at an intermediate point and sealed in place, a front fork mounted in the bearing post, a relatively short tubular tank sealed in the tubular beam at the rear and a rear cap sealing both tanks, whereby a pair of independent tanks for gas and oil are provided.

In witness whereof I have hereunto set my hand this 22d day of December, 1916.

ARTHUR HUGO CECIL GIBSON.